Dec. 31, 1968  S. J. ASSEO  3,419,777
SPEED REGULATING SYSTEM PROVIDING CONSTANT LOOP GAIN
Filed March 29, 1966
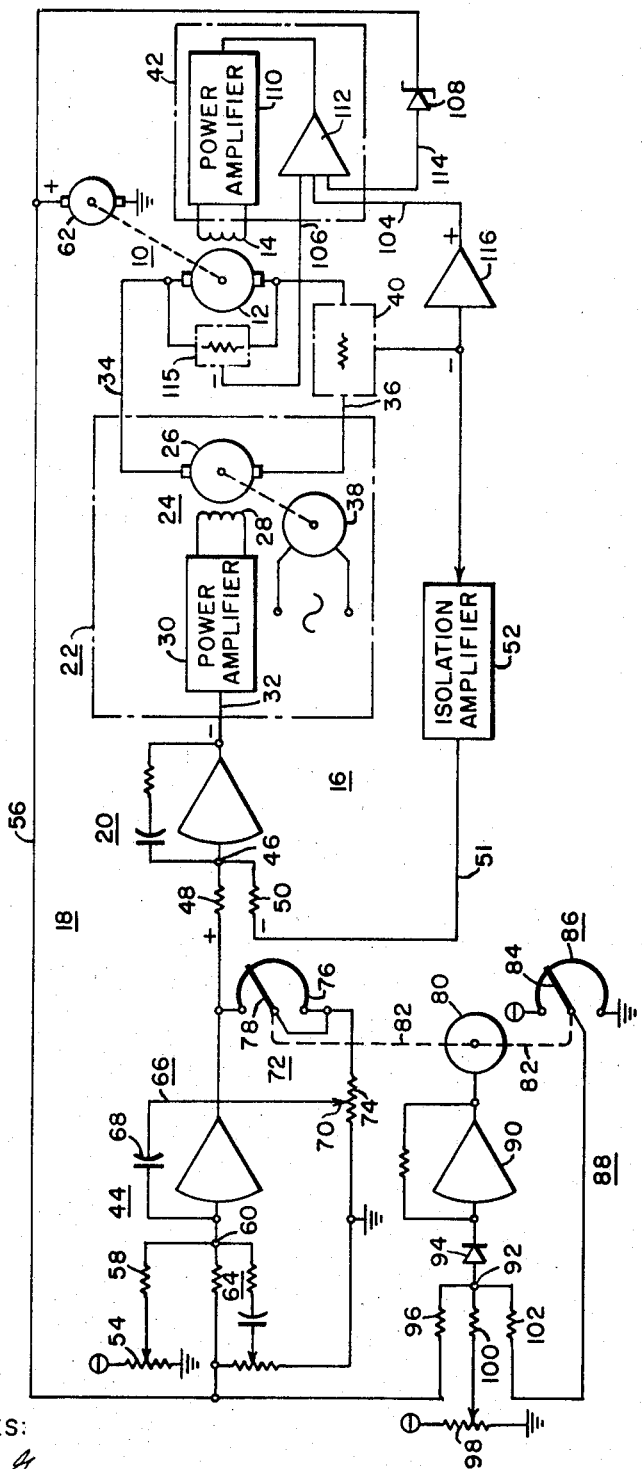
WITNESSES:
INVENTOR
Sabi J. Asseo
BY
ATTORNEY

United States Patent Office 3,419,777
Patented Dec. 31, 1968

3,419,777
SPEED REGULATING SYSTEM PROVIDING CONSTANT LOOP GAIN
Sabi J. Asseo, Buffalo, N.Y., assignor to Westinghouse Electric Corporation, Pittsburgh, Pa., a corporation of Pennsylvania
Filed Mar. 29, 1966, Ser. No. 538,270
4 Claims. (Cl. 318—338)

ABSTRACT OF THE DISCLOSURE

A speed regulating system for a DC motor is disclosed wherein the gain of a speed controller is increased as the motor speed increases above the base speed with the introduction of field weakening into the system. Also in the system the speed controller is operated as a pure integrator with actual speed feedback being provided thereto to eliminate overshoot in the actual speed condition.

---

This invention relates to condition regulating servo systems, and more particularly to a system for regulating speed of a DC (direct current) motor.

In DC motor speed regulating loops, for full range control, armature voltage is controlled up to base speed, and field weakening is employed to increase speed above base speed. (Base speed is that speed at rated armature voltage and rated field voltage.) In the range above base speed, speed loop gain normally tends to decrease because of decrease in motor gain (torque decreases due to field weakening). In accordance with the present invention, this decrease in speed loop gain in the field weakening region, is compensated for by introducing, in response to speed, compensatory gain changes in the speed loop such as to maintain the speed loop gain constant. In a specific exemplary embodiment, the gain of an amplifier employed as the speed controller in the speed loop is increased with increase of motor speed. This insures uniform system response and stability over the entire speed range.

It is therefore an object of the present invention to maintain constant loop gain while the field is weakened above base speed.

Another object is to increase the gain of the speed controller in a speed regulating loop as the motor speed is increased by field weakening.

Another aspect of the invention is elimination of overshoot of the actual value of a condition beyond desired reference value in a condition regulating system wherein a proportional-integral (PI) controller responsive to condition reference and actual condition feedback signals feeds a current controller whose output controls the value of the condition. Integration characteristic in the controller is necessary to avoid steady state error; zero error is dedesirable. However an overshoot is necessary so that error can settle to zero. An overshoot in the actual value of the condition is undesirable because it shocks the system and increases the settling time. In accordance with one aspect of the invention, the overshoot in the actual condition is avoided by changing the proportional-integral controller to a pure integrator and feeding the actual condition feedback to the controller through a lead network, thus creating an artificial overshoot in the feedback without overshoot in the actual condition.

It is thus a further object of the invention to eliminate overshoot of actual condition in condition regulating system.

Other and further objects and advantages of the invention will become apparent from the following detailed description taken in connection with the single figure drawing showing a speed regulator incorporating a preferred embodiment of the invention.

The system shown in the drawing regulates the speed of a motor 10 having an armature 12 and a field 14. Included in the system is a current regulating inner loop 16 and a speed regulating outer loop 18 superimposed on the inner loop. Effectively, loops 18 and 16 are cascaded in that order.

The current regulating loop 16 includes a current controller 20 and a power supply source 22, which responds to the current controller. In turn, current controller 20 is responsive jointly to the output of the speed loop 18 and a negative feedback signal that is a function of the current supplied to the motor armature. Current controller 20 is shown as an inverting operational amplifier with a capacitor-resistor feedback network making the amplifier a proportional integrator (known as a PI controller).

The power supply source 22 provides an output to the motor armature 12 that is a function of an input control parameter. For example the output voltage of the source 22 is proportional to the magnitude of an input control signal supplied by the controller 20. By way of example the power supply 22 is shown as comprising a DC generator 24 having an armature 26 and a main field 28 energized by the output of a power amplifier 30 whose control input circuit is coupled to the output of controller 20.

Amplifier 30 provides an average DC output voltage that is proportional to control signals applied to its control input line 32, which in this example is connected to the output line of controller 20. Amplifier 30 may be of any suitable type. For example, it may have an output stage employing semi-conductor controlled rectifiers that are phase controlled by gating circuits in response to input controlled signals supplied on line 32. The generator armature 26 supplies power to the power output lines 34 and 36 of the power supply source. The generator 24 is shown as being driven by a suitably powered electric motor 38.

The output line 34 is connected to one terminal of the armature 12 of motor 10, while the other output line 36 is connected through a current sampling resistor 40 to the other terminal of armature 12. Motor 10 is provided with a main field 14 connected to a suitable power source 42 for supplying constant field voltage up to base speed, and field weakening control above base speed. Field source 42 is shown by way of example as a CEMF (counter electromotive force) regulator. Both the generator 24 and the motor 10 may have series field windings which are omitted to simplify the illustration. Motor 10 may be considered as driving a load (not shown). If desired, the power amplifier 30 may be arranged to supply motor armature 12 directly, in which case the intervening generator 24 is eliminated, and the output lines of amplifier 30 are connected directly to lines 34 and 36. The output of controller 20 is a current error signal representing the difference between commanded current and the actual armature current of the motor 10.

A current command signal derived from the output of a speed controller 44 in the speed loop 18 is applied to the summing junction 46 in the input of controller 20 through an input resistor 48. A negative feedback signal proportional to motor armature current is applied through an input resistor 50 to the summing junction 46. The feedback signal is produced by a feedback circuit 51 that includes an isolation amplifier 52 whose output is connected to the input resistor 50, and whose input is taken from across resistor 40. Amplifier 52 effects isolation between input and output and may be of any suitable type, for example, a magnetic amplifier. If isolation and/or amplification are not required, the isolating amplifier 52 may be dispensed with.

The current regulating loop 16 is so arranged that the current command signal supplied to the input resistor 48 and the feedback signal applied to resistor 50 are summed to energize the current controller 20 in such a manner that the armature current in the armature circuit of the motor 10 is regulated to a value that is a function of the signal derived from the output of speed controller 44 and applied to the input resistor 48.

Besides the controller 44, the speed loop 18 contains the current loop 16 and also includes an adjustable speed reference source 54 and an actual speed negative feedback circuit 56. The output of the speed reference source 54 is coupled to an input resistor 58 connected to the summing junction 60 in the input of controller 44. Source 54, which may be a potentiometer, connected across a suitable DC source, supplies to the summing junction 60 a speed reference or command signal that is proportional to a desired (commanded) speed for the motor 10.

Feedback circuit 56 applies to the summing junction 60 of controller 44 a signal which is a function of the actual speed of motor 10. The feedback circuit 56 includes a DC tachometer generator 62 mechanically coupled to the motor 16. The output of the tachometer generator is proportional to the speed of motor 10 and is applied through a lead network 64 to the summing junction 60 in negative feedback relation to the reference speed signal applied to that summing junction through resistor 58. The arrangement of the speed regulating loop 18 and its relation to the current regulating loop 16 is such that the speed of motor 10 is regulated to a value dictated by the speed reference signal from the speed command source 54.

Speed controller 44 is shown as an inverting operational amplifier with a capacitor feedback making the amplifier an integrator. Because of its summing input, the amplifier may also be termed a summing integrator. The capacitor feedback network 66 includes a capacitor 68 connected to an adjustable tap 70 of voltage divider 72 made up of series-connected variable resistors 74 and 76. It will be appreciated that the ratio of resistance on each side of tap 70 is a factor in determining the gain of the amplifier 44, and that the gain may be changed by adjusting either tap 70 or rheostat 76. The gain is increased as the arm 78 is moved clockwise.

Rheostat 76 is provided with a movable contact arm 78 driven by a motor 80 through a coupling 82, that also drives the contact arm 84 of a feedback rheostat 86 in a position servo system 68. The purpose of servo system 88 is to regulate the position of contact arm 78 in accordance with the value of the speed of motor 10 at speeds above base speed.

The servo system 88 further includes a position controller 90 shown as a proportional inverting operational amplifier having an input summing junction 92 in circuit with a diode 94. The output of amplifier 90 drives the motor 80. The output of tachometer 62 is applied to the summing junction 92 through an input resistor 96. A negative bias from a source 98 is applied to the summing junction 92 through an input resistor 100. Negative feedback proportional to actual position of shaft 82 and rheostat arms 78 and 84 is supplied from contact arm 84 to the summing junction 92 through input resistor 102. The bias from source 98 is opposed to the tachometer 62 voltage, and is of such value that it is exceeded and overcome by the tachometer voltage only when base speed is exceeded by motor 10.

The arrangement of servo system 88 and arm 78 is such that until motor 10 reaches base speed, rheostat arm 78 is full counterclockwise at a relatively low gain setting. However, as soon as base speed is exceeded, the arm 78 is driven clockwise to increase the gain of controller 44 as the speed (above base speed) of motor 10 increases.

The speed regulating loop 18 contains the speed controller 44 and the current regulating loop 16, and functions to maintain the speed of motor 10 at a value determined by the speed reference signal. Above base speed, the CEMF regulator 42 joins the speed loop 18 in the regulating function. The speed controller 44 compares the speed feedback signal (from the tachometer 62) to the speed reference (speed command) signal and generates an error signal which is supplied as a current reference or command signal to the current regulating loop 16 to apply the correct voltage to the armature 12 so as to produce the required value of armature current that will cause motor 10 to run at a speed where the speed feedback signal equals the speed reference signal.

Assume that the polarity of the speed reference 54 is negative for forward rotation of the motor 10, and that for forward motor rotation, the polarity of the speed feedback signal supplied by line 56 to the input of controller 44 is positive. When the speed reference signal is greater than the speed feedback signal, the speed controller 44 is provided with a net negative input signal, and the controller 44 output increases in a positive direction, thus providing an increased positive command signal to the current controller 20. In turn, the output of controller 20 increases in a negative direction causing the power supply 22 to increase the current to armature 12 in the direction to increase the forward speed of motor 10. The motor speed increases until the speed feedback signal from tachometer 62 equals the speed reference signal. The reverse occurs in case the speed feedback signal is larger than the speed reference signal. More specifically, if the speed feedback signal is greater than the speed reference signal, the net input to speed controller 44 is positive. As a result, the controller 44 output applies a less positive command signal to the input of the current controller 20 thereby reducing the motor armature current. The motor speed will decrease until the speed feedback again equals the speed reference signal.

From the above it is seen that if it is desired to increase the motor speed, the output voltage of reference source 54 should be adjusted to a more negative reference value in order to supply a more negative reference value in order to supply a more negative speed command signal to the input of controller 44. Conversely, to reduce the speed, the output voltage of reference source 54 must be adjusted to a less negative value in order to supply a less negative speed reference signal to the input of the speed controller 44.

The CEMF regulator 42 is conventional in that it has the customary armature current and voltage feedback inputs 104 and 106. Up to base speed, the CEMF regulator 42 is biased to supply full constant field voltage to the field 14. However, above base speed, the output of tachometer 62 is applied as a new reference to the CEMF regulator through an opposing threshold device 108 such as a Zener diode, whose breakdown voltage equals the tachometer 62 voltage when motor 10 reaches base speed. It may be noted that this is a known application of a CEMF regulator in a speed regulating system. When the motor 10 passes base speed, the CEMF regulator takes over to provide field weakening for increased speeds.

By way of example, the CEMF regulator may include a power amplifier 110 driven by a summing operational amplifier 112. Power amplifier 110 supplies the motor field 14. Normally, that is up to base speed the CEMF regulator 42 is biased to supply full constant field voltage to the motor field 14. However, above base speed, Zener 108 breaks down and a positive speed reference is applied to the input line 114 of the regulator 42. The armature voltage signal obtained from a voltage sensor 115 across the armature 12 is applied on input line 106 as negative feedback relative to the reference on input line 114. The armature current feedback obtained from current sensor 40 is fed through an inverting amplifier 116 to input line 104 in opposite sense to the voltage feedback on line 106. Additionally field flux regulation may be employed if desired. This may be accomplished in a well known manner by supplying to the input drive of power amplifier 110 a negative feedback signal that is a function of the field current as shaped or modified to match the saturation curve of the motor field 14. Circuits of this type are well known and need no elaboration.

Up to base speed, the system regulates in a conventional manner. However, after base speed is reached, as reference 54 is adjusted more negative calling for yet higher speed, the motor 10 responds enough so that the voltage of tachometer generator 62 applied through Zener 108 causes the CEMF regulator 42 to weaken the motor field 14. At the same time, the speed feedback voltage overcomes the bias from source 98 in the input of servo system 88 to drive motor 80 to move rheostat arm 78 clockwise to increase the gain of controller 44 and thereby maintain the loop gain constant as speed is increased by field weakening.

It should be understood that with respect to the speed regulating scheme including the gain compensating feature, speed controller 44 may be a speed error generator of any suitable type having means for adjusting its gain in response to motor speeds above base speed. Also the speed feedback need not be through a lead network.

However, with respect to that aspect of the invention wherein the overshoot of actual condition (in this example, speed) is eliminated, then the condition controller 44 must be a pure summing integrator and the condition feedback must be through a lead network (rate network). In this manner actual condition overshoot is substituted for by artificially created overshoot in the condition feedback applied to the input of controller 44.

It is to be understood that the herein described arrangements are simply illustrative of the principles of the invention, and that other embodiments and applications are within the spirit and scope of the invention.

I claim as my invention:

1. In a servo system for regulating the speed of a DC motor over a range extending below and above base speed, speed controller first means responsive to the difference between commanded and actual speeds of the motor for controlling the speed of the motor by increasing the armature voltage while maintaining constant field voltage to increase motor speed in the speed range below base speed and by decreasing the field voltage to increase speed in the range above base speed, the improvement wherein said speed controller first means comprises a gain adjustable amplifier having a mechanically operable gain control, and second means responsive to the actual motor speed above base speed for increasing the gain of the amplifier as a function of increasing motor speed, said second means including a position servo arranged to position said gain control in response to the actual motor speed.

2. In a condition regulating system having an inner current regulating loop with an output to which said condition responds, and a condition regulating outer loop superposed on and commanding the inner loop in response to the difference between command and actual status of the condition, the improvement wherein said condition regulating loop comprises a pure integrator having a summing input circuit and an output to which the inner loop responds, means for applying a condition reference signal to said summing input circuit, said condition reference signal representing desired status of the condition, a lead network, and means for applying an actual condition negative feedback signal through said lead network to said summing input circuit.

3. The combination as in claim 2 wherein said condition is speed, and said condition regulating loop is a speed regulator for a motor.

4. The combination as in claim 2 wherein said regulating system regulates the speed of a DC motor over a range extending below and above base speed, and wherein said condition controller is a speed controller which in response to the difference between commanded and actual speeds of the motor controls the speed of the motor by increasing the armature voltage while maintaining constant field voltage to increase motor speed in the speed range below base speed and by decreasing the field voltage to increase speed in the range above base speed, and wherein said speed controller comprises a gain adjustable amplifier, and wherein there is means responsive to the actual motor speed above base speed for increasing the gain of the amplifier as a function of increasing motor speed.

References Cited

UNITED STATES PATENTS

| | | | |
|---|---|---|---|
| 2,802,977 | 8/1957 | Harvey et al. | 318—338 |
| 2,964,691 | 12/1960 | Dinger | 318—338 |
| 3,211,983 | 10/1965 | Dolphin | 318—338 |

ORIS L. RADER, *Primary Examiner.*

J. J. BAKER, *Assistant Examiner.*

U.S. Cl. X.R.

318—331